United States Patent [19]

Rigollet

[11] 4,068,282
[45] Jan. 10, 1978

[54] PROTECTIVE DEVICE FOR LOW CURRENT TRANSMISSION CIRCUITS

[75] Inventor: Francisco Diaz Rigollet, Bagneres-de-Bigorre, France

[73] Assignee: Etablissements Industriels C. Soule, Bagneres-de-Bigorre, France

[21] Appl. No.: 722,167

[22] Filed: Sept. 10, 1976

Related U.S. Application Data

[63] Continuation-in-part of Ser. No. 483,532, June 27, 1974, abandoned.

[30] Foreign Application Priority Data

July 17, 1973 France ................................. 73.26131

[51] Int. Cl.² .............................................. H02H 9/06

[52] U.S. Cl. ................................... 361/119; 179/1 C; 307/DIG. 1; 361/111

[58] Field of Search ........... 307/89, 326, 327, DIG. 1; 179/1 C; 178/63 R, 63 A, 63 B, 63 C; 340/189 R, 190; 250/199; 361/107, 111, 119

[56] References Cited

U.S. PATENT DOCUMENTS

| | | | |
|---|---|---|---|
| 3,181,033 | 4/1965 | Bakker | 361/119 |
| 3,346,811 | 10/1967 | Perry et al. | 340/190 |
| 3,569,835 | 3/1971 | Harner | 340/189 X |

Primary Examiner—Harry E. Moose, Jr.

[57] ABSTRACT

Each end of a transmission line comprises a lightning protector and a component ensuring a connection under complete electro-insulation with an emitter on one hand and a receiver on the other hand.

7 Claims, 2 Drawing Figures

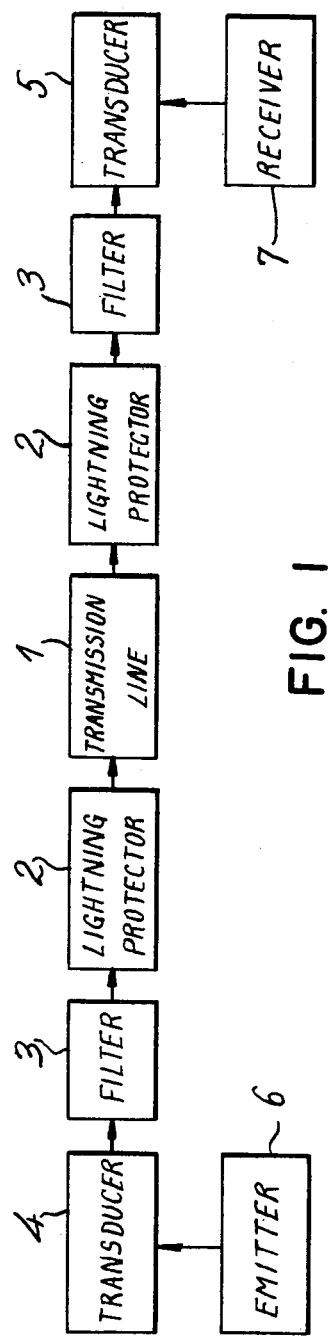
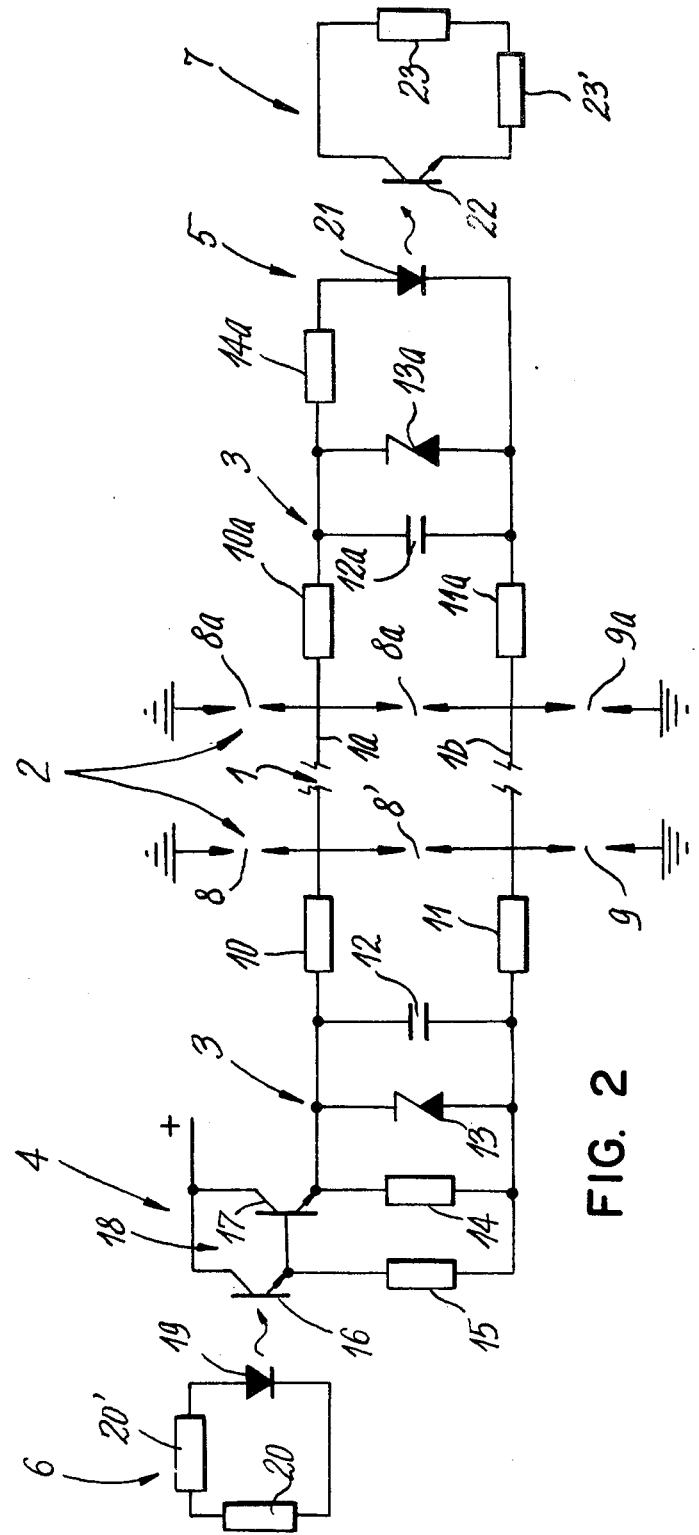

PROTECTIVE DEVICE FOR LOW CURRENT TRANSMISSION CIRCUITS

CROSS REFERENCE OF RELATED APPLICATION

This is a continuation-in-part of co-pending U.S. Application Ser. No. 483,532, filed June 27, 1974, now abandoned.

BACKGROUND OF THE INVENTION

It is often necessary to transmit data or control signals using telephonic circuits, and more generally low current transmission circuits, which can be submitted to various origin disturbances and particularly disturbances of atmospheric origin.

The energy of the disturbances has a considerable influence on the accuracy of the transmitted signals and also on the circuits and equipments placed at the ends of the circuits for the purpose of either transmitting or receiving said signals. Thus phenomena of atmospheric origin produce, on the transmission lines, disturbances having a very important energy and causing, in almost all cases, the destruction of the circuits connected to the line in question.

Various solutions have been offered, especially the incorporation of lightning-protectors in the circuits, but if said solutions are, generally, efficient for the protection of the circuit, they do not, most of the time, prevent the destruction of the apparatus placed at the ends of the lines and nearly always lead to the destruction of the emitting and receiving apparatus respectively placed at each end of the line.

The present invention copes with said disadvantages in providing protective blocks at each end of the transmission circuit, as well on the emitting side as on the receiving side of the signals, whereby totally separating emitting-receiving units from the line properly so-called.

It is known in the art of line protection to use a transformer to separate the emitting-receiving units from the transmission line. However, such transformers themselves transmit a part of the energy of the disturbance from the line to the emitting-receiving units, whereby total true isolation is not properly provided. As a result, the disturbance still may cause destruction of the units.

It then appears that one of the primary purposes of the invention is to protect the transmitter and the receiver if a transmission line is subjected to a strike of lightning. Thus, a transformer or any other close coupling component could not be used as successfully as applicant's protective device in which the totality of isolation for the transmitter and receiver is an important aspect of the invention.

SUMMARY OF THE INVENTION

The protective device for low current transmission line is then characterized in that it comprises a transmitting unit connected to one end of said transmission line and a receiving unit connected to the other end of said line, said transmitting unit comprising at least one lightning protector connected to said one end of said line, a filter network across said one end of said line, a transducer for applying signal to said one end of said line, and an emitter for communicating with said transducer through an electrically and magnetically insulated medium, whereby low current signals produced by said transmitting unit can traverse said medium between said emitter and said transducer, and signals produced by energy containing disturbances cannot; said receiving unit comprising at least one second lightning protector connected to said other end of said line, a second filter network across said other end of said line, a second transducer for receiving signals on said line, and a receiver for communicating with said second transducer through an electrically and magnetically insulated medium, whereby low current signals produced by said transmitting unit can traverse said medium between said emitter and said transducer, and signals produced by energy containing disturbances cannot; the device further comprising means to check the ability of the line to transmit signals.

The invention will be further explained, and other objects and features will become apparent with reference to the accompanying drawings.

BRIEF DESCRIPTION OF THE DRAWINGS

FIG. 1 is a general block diagram of the invention, and

FIG. 2 shows one embodiment of the invention.

DESCRIPTION OF THE PREFERRED EMBODIMENT

The above described device has been diagrammatically summarized in the block diagram of FIG. 1. In FIG. 1, there has been shown that at each side of a transmission line 1 is connected at least one lightning protector 2 connected through a filter 3 and to a transducer 4, 5. The transducer 4 and 5 respectively ensures an electrically insulated connection with an emitter 6 on the left side of the line 1 and with a receiver 7 on the right side of the line. The transducer may be of various types excluding any transformers which will actually transmit a part of the disturbing energy of the line to the emitter on one side and from the line to the receiver on the other side, the totality of isolation for the transmitter and receiver being an important aspect of the invention.

Typically, the transducer 4, 5 may be a unit comprising an electro-luminescent device and a photo electrical device, or may be formed by grouping an electroluminescent diode with a photo-transistor, or it may comprise an optical fiber device, or may be of a hertzian wave type, or still of a Laser type.

FIG. 2 shows a precise embodiment of the invention using the same reference numerals as in FIG. 1 for the like parts. FIG. 2 shows the transmission line or circuit 1 of FIG. 1 constituted by a pair of wires 1a and 1b. The left end of the transmission line, which is the end connected to the emitter 6, comprises a lightning protector 2 with lightning protective elements 8, 8', 9; a filter 3 with resistances 10, 11, a capacitive element 12, and a Zener diode 13; a transducer 4 with resistances 14, 15 and transistors 16, 17. In the present case, a transistorized photo-sensitive device 18 of the transducer 4 receives from the emitter 16 a light-wave through an electro-luminescent diode 19 driven by a transmitter 20 to constitute a photo-coupling unit. In some cases, the transducer 4 can be a receiver of Hertz waves coupled to the emitter 6, or a device transmitting through optical fibers, or still a Laser device. (See general block diagram of FIG. 1).

On the right end of the transmission line 1, is placed a lightning protector 2 with lightning-protective elements 8a, 8'a, 9a; a filter 3 with resistances 10a, 11a, a capacitive element 12a, and a Zener diode 13a; a transducer 5 with one or more resistances 14a. In the present case, an electroluminescent diode 21 of the transducer 5 supplies light to a photo-sensitive element 22 connected to receiving means 23. A photo-coupling unit can thus be used though there can be used any component ensuring an electrically and magnetically insulated connection between the line 1 properly so-called and the receiver 7; and said component may be similar to the transducer 4 and constituted of an emitter of Hertz waves coupled to the receiving means 23 or a device transmitting through optical fibers, or still a Laser device (see general block diagram of FIG. 1).

The described circuit thus comprises, at each end of the transmission line 1, an electrically and magnetically insulated transmitting receiving unit (4, 6 left portion of the drawing; 5, 7 right portion of the drawing); a filter 3 comprising resistances, capacitive elements and Zener diodes, and finally a lightning protector 2.

If, for any reason, for example due to an atmospheric disturbance, the line receives an important quantity of energy, for example several tens of thousands of amperes (case of a lightning), immediately occurs a high overvoltage which is absorbed in a very short period of time by the lightning-protector 2 and by the end filters 3. Then the elements 18, 21 are practically not submitted to the high energy which very rapidly runs to the ground and cannot, in general, cause any damage on the complete connection between the emitter 6 and the receiver 7.

In order to check if the connection between the emitter 6 and the receiver 7 is in order, the invention provides to use a checking emitter 20' placed in the emitter 6 and continuously sending when the line is under use a checking signal which is then received by a checking receiver 23' placed in the receiver 7. The checking receiver 23' may comprise for example a lamp which is lit by the checking signal if the line is in order, whereby people at the receiving station will be advised of the state of the line. If no people is provided to be at the receiving station, as is the case if the receiver is associated with a remote control, then due to the symmetry between the right and the left ends of the transmission line, the checking receiver 23' can then be a transmitter-receiver system or a transponder sending back to the emitter 6 a signal if it receives the proper checking signal from the checking emitter 20', i.e. in case the line is in order. Should the line be destroyed or out-of-order, which will be noticed by absence of reception of the checking signal, then the transmitting and receiving means 20 and 23 will still be perfectly protected, and all that is necessary to be done is only to connect them by another line, which could be mounted in parallel and as a spare line, to immediately ensure a suitable operation thus preventing any interruption in the operation of the unit. Actually such an interruption could be extremely serious chiefly when are concerned devices presently usually utilized in the safety services of factories, public buildings such as hospitals and others, railways stations, and principally in the airports in which lightnings often fall on a transmission line.

In short the invention provides a protection of each end of the transmission line, allowing, in a first phase, to send to the ground, through the lightning-protectors, very important energies with currents which can reach several thousands of amperes. In a second phase, the voltage between the two elements forming the line is restricted to a level suitable with the insulation of the same and with the energy which can be sent out by the electronic protection as above described. In all the cases, the voltage appearing between the devices electrically connected to the transmission line and the ground is smaller than the insulating level of the transmitting elements. Moreover, and this is a very important aspect of the present invention, the receiver and the transmitter are totally isolated from the transmission line.

Although the invention is particularly usable in relation with a telephonic circuit, the invention is not restricted to said application and can be applied to any remote controls, signallings, measurings, etc..., which can be performed through transmission lines other than telephonic circuit lines.

I claim:

1. A protective device for low current transmission lines, comprising a transmitting unit connected to one end of said transmission line and a receiving unit connected to the other end of said line, said transmitting unit comprising at least one lightning protector connected to said one end of said line, a filter network across said one end of said line, a transducer for applying signal to said one end of said line, and an emitter for communicating with said transducer through an electrically and magnetically insulated medium, whereby low current signals produced by said transmitting unit can traverse said medium between said emitter and said transducer, and signals produced by energy containing disturbances cannot; said receiving unit comprising at least one second lightning protector connected to said other end of said line, a second filter network across said other end of said line, a second transducer for receiving signals on said line, and a receiver for communicating with said second transducer through an electrically and magnetically insulated medium, whereby low current signals on said line can traverse said medium between said transducer and said receiver, and signals produced by energy containing disturbances cannot, the device further comprising means to check the ability of the line to transmit signals.

2. The device as set forth in claim 1, wherein each transducer comprises an electroluminescent device and a photoelectrical device.

3. The device as set forth in claim 2, wherein each transducer is formed by grouping an electroluminescent diode with a photo-transistor.

4. The device as set forth in claim 1, wherein each transducer comprises an optical fiber device.

5. The device as set forth in claim 1, wherein each transducer is of a hertzian wave type.

6. The device as set forth in claim 1, wherein each transducer is of a Laser type.

7. The device as set forth in claim 1, wherein the filter is constituted by at least one resistance, at least one capacitor, and at least one Zener diode.

* * * * *